Patented Dec. 24, 1940

2,226,404

UNITED STATES PATENT OFFICE 2,226,404

LUMINESCENT MATERIAL

Henry Grainger Jenkins, Pinner, and Alfred Hamilton McKeag, North Wembley, England, assignors to General Electric Company, a corporation of New York No Drawing. Application May 8, 1940, Serial No. 334,080. In Great Britain May 15, 1939

2 Claims. (Cl. 250—81)

Our invention relates to luminescent materials of the type comprising a luminescent silicate, and to electric discharge lamps in which such materials are present within the envelope.

One object of our invention is to provide luminescent silicate materials characterized by a marked reduction in the discoloration to which such silicates are liable, especially when exposed to a mercury vapor discharge. A feature of the invention is the addition of a suitable non-luminescent carbonate to luminescent silicates to thereby effect a reduction in the discoloration of such silicates.

Still another object of our invention is to provide an electric discharge lamp comprising an envelope, through which a discharge through low-pressure mercury-vapor (which may be mixed in the usual manner with rare gas) is adapted to pass, and a coating of luminescent material on the interior of the said envelope, the said luminescent material comprising a luminescent silicate admixed with a carbonate of such a nature and in such a proportion that the initial efficiency of the silicate is not grealy reduced by its presence but the loss in the luminous output thereof, throughout the life of the lamp, is substantially retarded.

Further objects and advantages of our invention will appear from the following description of species thereof.

Some of the best known luminescent materials are silicates, for example, zinc orthosilicate, zinc mesodisilicate ($ZnSi_2O_5$), zinc-beryllium silicate and cadmium silicate. These materials are often coated on the interior of low-pressure mercury vapor discharge devices. It is well known that, when used in such manner, the luminescent silicates are apt to lose their efficiency during life. Thus, a lamp in which zinc orthosilicate is coated on the interior of such a device may decrease as much as 50% in luminous output in the first 2000 hours of lamp life.

We have found that this loss of efficiency can be substantially retarded by mixing certain carbonates with the luminescent silicate. According to the invention, a luminescent material of the type specified comprises a carbonate, whose weight is not less than about one per cent and not more than about 30 per cent of the weight of the silicate, mixed intimately with the silicate whereby the luminescent material is less subject to discoloration, when used in a discharge device, than if the said carbonate were absent.

The carbonates that we have found most effective are those of barium, strontium, calcium, zinc, cerium and thorium. The beneficial effect of the carbonate generally increases, as might be expected, with the proportion in which it is present; on the other hand the carbonate, if present in large proportions, say 30%, decreases the initial efficiency somewhat by dilution. Accordingly, a compromise has to be adopted. There is seldom reason to provide less than about 1% or more than about 30% of carbonate. 5% by weight is generally a suitable proportion to mix with zinc orthosilicate.

The silicate is preferably prepared in the usual way and the carbonate mixed intimately with it after its preparation. The materials to be mixed should both be finely ground. Intimate mixing may be promoted by heating the mixed powder to about 400° C. for about half an hour.

It is not asserted that the carbonate will prevent entirely the loss of luminous output with life. But in the case of zinc ortho-silicate, for example, it may reduce such loss from 50% in the first 2000 hours to 35% or even less.

The effects of the carbonates appear to be additive, so that any combination of carbonates, each satisfactory, may be mixed with the same silicate. Of the above-mentioned suitable carbonates, those of barium and strontium, or mixtures thereof, have been found particularly effective.

What we claim as new and desire to secure by Letters Patent of the United States is:

1. A luminescent coating mixture for application to the interior of a mercury vapor discharge device comprising a luminescent silicate intimately admixed with at least one compound included within the group consisting of the carbonates of barium, strontium, calcium, zinc, cerium and thorium, the proportion by weight of said carbonate being not less than about one per cent and no more than about 30 per cent of the weight of said silicate, said carbonate serving to minimize discoloration of said luminescent material.

2. A luminescent coating mixture for application to the interior of a mercury vapor discharge device comprising zinc orthosilicate intimately admixed with at least one compound included within the group consisting of the carbonates of barium, strontium, calcium, zinc, cerium and thorium, the proportion by weight of said carbonate being approximately 5 per cent of the weight of said orthosilicate, said carbonate serving to minimize discoloration of said luminescent material.

HENRY GRAINGER JENKINS.
ALFRED HAMILTON McKEAG.